W. DUFFNER.
Stump Extractors.
No. 143,129. Patented September 23, 1873.
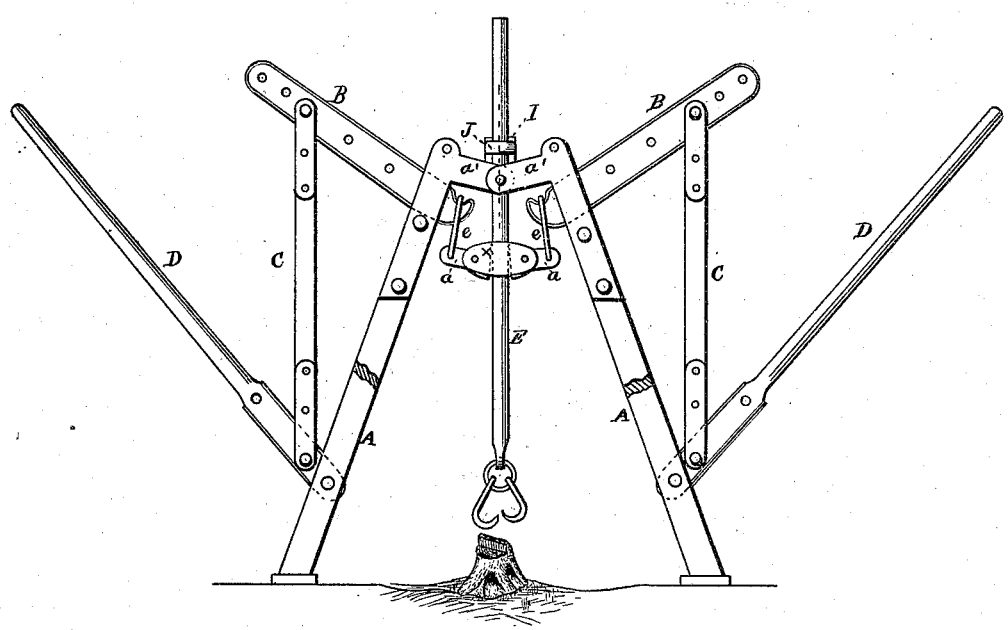

UNITED STATES PATENT OFFICE.

WILLIAM DUFFNER, OF JASPER, INDIANA.

IMPROVEMENT IN STUMP-EXTRACTORS.

Specification forming part of Letters Patent No. 143,129, dated September 23, 1873; application filed August 27, 1873.

*To all whom it may concern:*

Be it known that I, WILLIAM DUFFNER, of Jasper, in the county of Dubois and in the State of Indiana, have invented certain new and useful Improvements in Stump-Extractors; and do hereby declare that the following is a full, clear, and exact description thereof, reference being had to the accompanying drawings and to the letters of reference marked thereon, making a part of this specification.

The nature of my invention consists in a peculiar construction and arrangement of levers with a frame for making a stump-extractor, as will be more fully set forth.

In the annexed drawings, making part of this specification, Figure 1 represents a side view of the machine, and Figs. 2 and 3 sections of different parts, which will be described.

In the drawings, A A represent two strongly-built sections of frame-work, which are provided at their upper ends with arms $a'$ $a'$, through which pivots pass to connect them together. B B and D D represent levers, the former being pivoted to the frame pieces near their upper ends, while the latter are pivoted to them near their lower ends, as seen. These levers, on each side, are connected together by means of the connecting-bars C C, thus forming a system of compound levers on each side of the frame. E represents the draft-bar, which passes through a block, $x$. Pivoted in this block, and placed nearly binding on the draft-rod, are two short levers, $a$ $a$. To the outer ends of each of these levers are connected the loops or links $e$ $e$. The links $e$ $e$ catch over the inner ends of the levers B B, thus connecting them together. Between the two arms $a'$ $a'$ is placed a bar, H, the ends of which serve as pivots to connect said arms together. This bar H has an opening through it, and through which the draft-bar E passes. Secured upon the bar H is a crotched guide, I. J represents a clutch-ring, with an arm to it, said arm resting in the guide I. The draft-bar E passes through the clutch-ring.

In using this machine, hooks are connected to the lower end of the bar E, which are fastened into the stump to be extracted; then, by bearing down upon the levers, the levers $a$ $a$ are caused to nip or bind the bar E, at the same time lifting it upward. When the levers D D are elevated to take a fresh hold the block $x$ slides downward on the bar E, while the clutch-ring holds it fast. The operation of carrying down the levers is repeated, and the bar is caught and raised, as before, and again held, as stated, when the levers are raised until the stump is extracted.

What I claim is—

The combination of levers B, C, and D, frame A, block $x$, levers $a$ $a$, bar E, and clutch-ring J, as and for the purpose specified.

In testimony that I claim the foregoing I have hereunto set my hand this 13th day of August, 1873.

WILLIAM DUFFNER.

Witnesses:
 BAZIE L. GREENE,
 CHARLES EGG.